US009094312B2

(12) United States Patent
Amano

(10) Patent No.: US 9,094,312 B2
(45) Date of Patent: Jul. 28, 2015

(54) COMMUNICATION DEVICE, COMMUNICATION METHOD, AND COMPUTER READABLE RECORDING MEDIUM

(75) Inventor: Katsuhiro Amano, Toyota (JP)

(73) Assignee: Brother Kogyo Kabushiki Kaisha, Nagoya, Aichi-ken (JP)

(*) Notice: Subject to any disclaimer, the term of this patent is extended or adjusted under 35 U.S.C. 154(b) by 572 days.

(21) Appl. No.: 13/362,058

(22) Filed: Jan. 31, 2012

(65) Prior Publication Data
US 2012/0221714 A1 Aug. 30, 2012

(30) Foreign Application Priority Data
Feb. 25, 2011 (JP) ................................. 2011-039890

(51) Int. Cl.
*G06F 15/173* (2006.01)
*H04L 12/26* (2006.01)
*H04L 12/24* (2006.01)

(52) U.S. Cl.
CPC ........ *H04L 43/0882* (2013.01); *H04L 41/0896* (2013.01)

(58) Field of Classification Search
CPC .............. H04L 47/2416; H04L 47/822; H04L 43/0882; H04L 43/0888; H04L 47/10; H04L 47/12; H04L 47/25; H04L 1/0026; H04L 43/00; H04L 12/2602; H04W 28/02; H04W 28/22; H04W 24/00; H04W 24/02
USPC .......... 709/203, 220–224, 227–229; 370/232, 370/235–236, 253, 465, 468
See application file for complete search history.

(56) References Cited

U.S. PATENT DOCUMENTS 5,548,412 A * 8/1996 Minamizawa et al. ........ 358/406
2004/0119814 A1* 6/2004 Clisham et al. ............ 348/14.08
(Continued)

FOREIGN PATENT DOCUMENTS

EP 1921798 A1 5/2008
JP 4367505 11/2009

OTHER PUBLICATIONS

Calyam et al, "Orchestration of Network-Wide Active Measurements for Supporting Distributed Computing Applications", IEEE Transactions on Computers, IEEE Service Center, Los Alamitos, CA, vo156, No. 12, Dec. 1, 2007, pp. 1629-1642, XPOI 1194957.*
(Continued)

*Primary Examiner* — Brian J Gillis
*Assistant Examiner* — Austin Moreau
(74) *Attorney, Agent, or Firm* — Banner & Witcoff, Ltd.

(57) ABSTRACT

A communication device includes a controller configured to control the communication device to determine whether to permit measurement of a transmission channel bandwidth which is a usable bandwidth in a transmission channel to and from another communication device via a network, based on whether the other communication device satisfies a specified condition, in response to receiving an establishment request that requests establishment of a session from the other communication device, measure the transmission channel bandwidth to and from the other communication device, in response to determining that the measurement of the transmission channel bandwidth is permitted, and communicate with the other communication device using the measured transmission channel bandwidth, in response to measuring the transmission channel bandwidth and receiving a permit command that is a command to permit the establishment of the session with the other communication device.

12 Claims, 11 Drawing Sheets

(56) References Cited

U.S. PATENT DOCUMENTS

| | | | |
|---|---|---|---|
| 2005/0080848 A1* | 4/2005 | Shah | 709/204 |
| 2007/0248100 A1* | 10/2007 | Zuberi et al. | 370/395.41 |
| 2008/0219164 A1 | 9/2008 | Shimonishi | |
| 2010/0066808 A1* | 3/2010 | Tucker et al. | 348/14.09 |
| 2010/0180293 A1* | 7/2010 | Brown et al. | 725/32 |
| 2010/0235524 A1* | 9/2010 | Klemm et al. | 709/228 |

OTHER PUBLICATIONS

Extended European search report for application No. 12152721.2-2416 mailed Apr. 12, 2012.

Calyam et al, "Orchestration of Network-Wide Active Measurements for Supporting Distributed Computing Applications", IEEE Transactions on Computers, IEEE Service Center, Los Alamitos, CA, vol. 56, No. 12, Dec. 1, 2007, pp. 1629-1642, XP011194957.

Apr. 9, 2015—(EP) Office Action—App 12152721.2.

* cited by examiner

FIG. 3

| ID | | PERMIT/DENY INFORMATION |
|---|---|---|
| SIP-URI | ALIAS | |
| test01@brother.com | SUZUKI | PERMIT |
| test02@brother.com | SATO | PERMIT |
| test03@brother.com | YAMADA | PERMIT |
| test04@brother.com | KONDO | DENY |

| ID | HISTORY INFORMATION | | PERMIT/DENY INFORMATION |
|---|---|---|---|
| SIP-URI | COMMUNICATION DESCRIPTION | COMMUNICATION DATE/TIME | |
| test04@brother.com | COMMUNICATION | 2010/10/25  9 : 20 | PERMIT |
| test05@brother.com | MISSED COMMUNICATION | 2010/10/25  10 : 36 | DENY |
| test06@brother.com | COMMUNICATION DENIED | 2010/10/25  15 : 28 | DENY |
| test07@brother.com | COMMUNICATION | 2010/10/25  19 : 01 | PERMIT |

Figure 5:
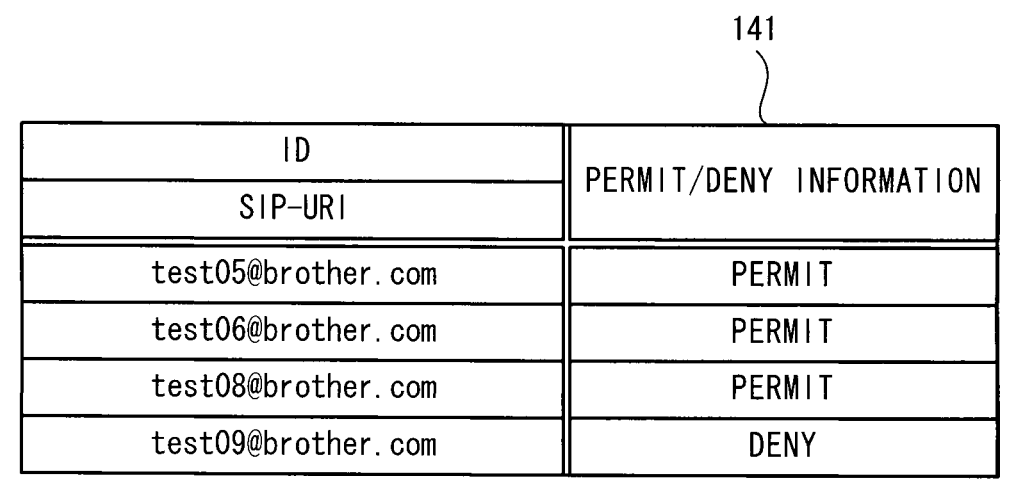

| ID | PERMIT/DENY INFORMATION |
|---|---|
| SIP-URI | |
| test05@brother.com | PERMIT |
| test06@brother.com | PERMIT |
| test08@brother.com | PERMIT |
| test09@brother.com | DENY |

COMMUNICATION DEVICE, COMMUNICATION METHOD, AND COMPUTER READABLE RECORDING MEDIUM

CROSS-REFERENCE TO RELATED APPLICATION

This application claims priority to Japanese Patent Application No. 2011-039890, filed Feb. 25, 2011, the content of which is hereby incorporated herein by reference.

BACKGROUND

The present disclosure relates to a communication device, a communication method, and a non-transitory computer readable recording medium that are capable of performing communication by measuring a state of a network and adjusting a communication condition.

A communication device has been proposed that is capable of measuring a state of a network. For example, a communication device is known that may transmit a plurality of measurement packets to another communication device. The time from when the measurement packet is transmitted until an ACK packet is received may be measured as a round-trip time. An optimum transmission bandwidth may be specified based on the measured round-trip time. By transmitting a data packet using the specified transmission bandwidth, the communication device is able to perform communication that utilizes the network efficiently.

SUMMARY

It is assumed that a third party intentionally makes a request to the communication device to open an unnecessary connection, for the purpose of interfering with the communication of the data packet. In the communication device that is described above, authentication of the communication device that requested the opening of the connection is not performed. Therefore, the communication of the measurement packets in order to measure the state of the network may be started in response to the request to open the connection. The network bandwidth may be appropriated by the transmitting of the measurement packets. This may make it impossible for the communication device to accurately measure the state of the network between the communication device and a desired communication device. The operations of other applications that are being used may be adversely affected. It therefore may become impossible to properly perform the communication of the data packets with the desired other communication device.

Various embodiments of the broad principles derived herein provide a communication device, a communication method, and a computer readable recording medium that are capable of accurately measuring a state of a network between the communication device and another communication device and starting communication.

Aspects described herein may provide a communication device that includes a controller configured to control the communication device to determine whether to permit measurement of a transmission channel bandwidth which is a usable bandwidth in a transmission channel to and from another communication device via a network, based on whether the other communication device satisfies a specified condition, in response to receiving an establishment request that requests establishment of a session from the other communication device. The controller is also configured to control the communication device to measure the transmission channel bandwidth to and from the other communication device, in response to determining that the measurement of the transmission channel bandwidth is permitted. The controller is further configured to control the communication device to communicate with the other communication device using the measured transmission channel bandwidth, in response to measuring the transmission channel bandwidth and receiving a permit command that is a command to permit the establishment of the session with the other communication device.

Aspects described herein may also provide a method that includes determining by a communication device, in response to receiving an establishment request that requests establishment of a session from another communication device, whether to permit measurement of a transmission channel bandwidth which is a usable bandwidth in a transmission channel to and from the other communication device via a network, based on whether the other communication device satisfies a specified condition. The method also includes measuring by the communication device the transmission channel bandwidth to and from the other communication device, in response to a determining that the measurement of the transmission channel bandwidth is permitted. The method further includes communicating by the communication device, in response to measuring the transmission channel bandwidth and receiving a permit command that is a command to permit the establishment of the session with the other communication device, with the other communication device using the measured transmission channel bandwidth.

Aspects described herein may further provide a non-transitory computer readable recording medium storing computer readable instructions that when executed, cause a communication device to determine, in response to receiving an establishment request that requests establishment of a session from another communication device, whether to permit measurement of a transmission channel bandwidth which is a usable bandwidth in a transmission channel to and from the other communication device, based on whether the other communication device satisfies a specified condition. The computer readable instructions also cause the communication device to measure the transmission channel bandwidth to and from the other communication device, in response to a determination that the measurement of the transmission channel bandwidth is permitted. The computer readable instructions further cause the communication device to communicate, in response to measuring the transmission channel bandwidth and receiving a permit command that is a command to permit the establishment of the session with the other communication device, with the other communication device using the measured transmission channel bandwidth.

BRIEF DESCRIPTION OF THE DRAWINGS

Embodiments will be described below in detail with reference to the accompanying drawings in which:

FIG. 3 is a schematic diagram that shows an example of a first table 231;

FIG. 4 is a schematic diagram that shows an example of a second table 232;

FIG. 5 is a schematic diagram that shows an example of a third table 141;

DETAILED DESCRIPTION

Hereinafter, an embodiment of the present disclosure will be explained with reference to the drawings.

Figure 1:
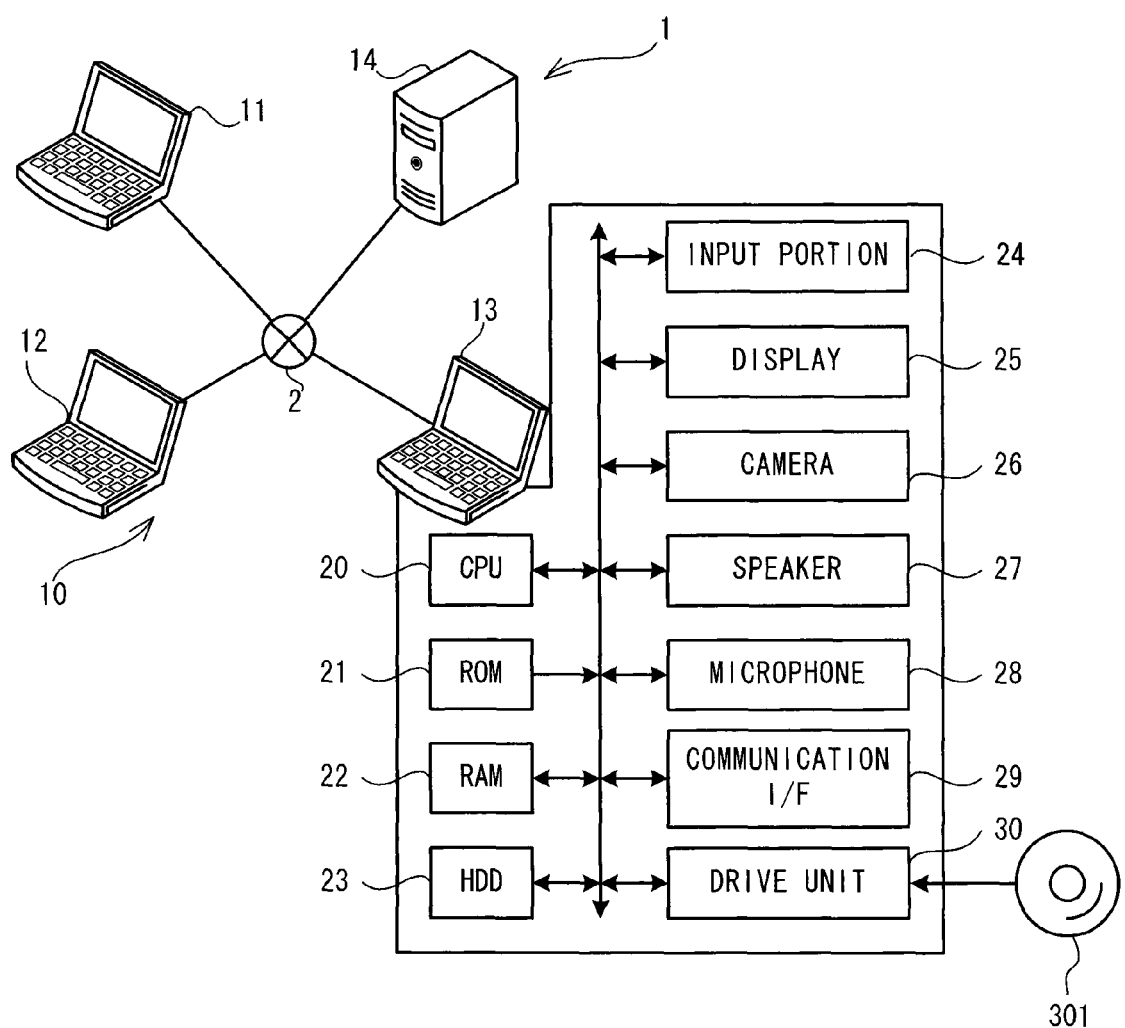
FIG. 1 is a figure that shows an example of an overview of a communication system 1 and an electrical configuration of a communication device 10.

A communication system 1 will be explained with reference to FIG. 1. The communication system 1 includes communication devices 11, 12, 13 and a server 14. Hereinafter, where the communication devices 11, 12, 13 are not differentiated, as well as where they are referenced collectively, the communication devices 11, 12, 13 may be referred to as the communication devices 10. Each of the communication devices 10 is capable of conducting video conferencing with another communication device 10 by performing peer-to-peer (P2P) communication through a network 2. The communication devices 10 may be generally known personal computers or specialized video conferencing terminals, for example. In FIG. 1, the reference numerals (11, 12, and 13) that are assigned to the communication devices 10 indicate identification numbers of the communication devices 10. The server 14 is an authentication server that is capable of authenticating the specific communication devices 10. The communication devices 10 and the server 14 are able to perform communication through the network 2.

An electrical configuration of the communication device 10 will be explained. The communication device 10 includes a CPU 20 that performs control of the communication device 10. The CPU 20 is electrically connected to a ROM 21, a RAM 22, a hard disk drive (HDD) 23, an input portion 24, a display 25, a camera 26, a speaker 27, a microphone 28, a communication interface (I/F) 29, and a drive unit 30. The ROM 21 may store a boot program, a BIOS, an OS, and the like. The RAM 22 may store temporary data such as a timer and a counter. The HDD 23 may store a communication program for the CPU 20. The HDD 23 may store a first table 231 and a second table 232 that will be described below. The input portion 24 may be a keyboard or a mouse that accepts input from a user. The communication I/F 29 may perform control of timing during the performing of communication with another communication device 10 through the network 2. The drive unit 30 can read information that is stored in a storage medium 301. For example, when the communication device 10 is set up, a communication program that is stored in the storage medium 301 may be read by the drive unit 30 and stored in the HDD 23. The communication program may be downloaded from a specified server device through a network.

The communication device 10 may specify a transmission channel capacity that can be used in the network 2. The communication device 10 may limit the volume of the transmitted data such that the data that are transmitted may be within the specified transmission channel capacity. This makes it possible for the communication device 10 to utilize efficiently the usable transmission channel capacity of the network 2. Hereinafter, the transmission channel capacity may be referred to as the bandwidth. The usable transmission channel capacity may be referred to as usable bandwidth.

A method that is implemented in the communication device 10 for measuring the usable bandwidth will be explained. The communication device 10 may transmit a plurality of measurement packets to another communication device 10 through the network 2. The other communication device 10 may receive the plurality of the measurement packets. If the bandwidth (units: bits per second (bps)) that is used when the communication device 10 transmits the measurement packets is not greater than the usable bandwidth (units: bits per second (bps)), the measurement packets may not be congested within the network 2. In that case, the receiving interval at which the other communication device 10 receives the measurement packets that have been transmitted from the communication device 10 may ideally be the same as the transmission interval for the measurement packets. On the other hand, if the bandwidth that is used when the measurement packets are transmitted is greater than the usable bandwidth, the measurement packets may be congested within the network 2. Therefore, the receiving interval may become longer than the transmission interval.

By gradually changing the transmission interval, the communication device 10 may gradually change the bandwidth that is used when the measurement packets are transmitted from a wider bandwidth to a narrower bandwidth. In other words, the communication device 10 may gradually change the bandwidth that is used when the measurement packets are transmitted from a shorter transmission interval to a longer transmission interval. As long as the bandwidth that is used when the measurement packets are transmitted is greater than the usable bandwidth, the receiving interval may be longer than the transmission interval. If the bandwidth that is used when the measurement packets are transmitted is not greater than the usable bandwidth, the receiving interval and the transmission interval may be almost the same.

The other communication device 10 may specify, as the usable bandwidth, the bandwidth at the point when the relationship changes between the transmission interval for the measurement packets that are transmitted from the communication device 10 and the receiving interval when the measurement packets are received. The communication device 10 may be notified of the usable bandwidth that is specified by the other communication device 10. Hereinafter, the communication described above that is performed in order to measure the usable bandwidth may be referred to as the measurement communication. The present disclosure is not limited to the measurement method that is described above, and another measurement method may be used.

A communication sequence in a case where the usable bandwidth between the communication devices 11 and 12 is measured and data communication is started will be explained with reference to FIG. 2. It is assumed that a command to start a video conference with the communication device 12 is input by a user of the communication device 11 through the input portion 24 (Step S11). The communication device 11 may transmit to the communication device 12 a packet that requests the establishment of a session with the communication device 12. Hereinafter, the packet that requests the establishment of a session may be referred to as the establishment request packet. The communication device 12 may receive the establishment request packet (Step S13).

The communication device 12 may notify the user of the communication device 12 by displaying on the display 25 a message that indicates that the request to establish the session has come from the communication device 11 (Step S15). The communication device 12 may prompt the user for input by displaying on the display 25 a screen on which a command can be input to permit or deny the establishment of the session.

Regardless of whether a command has been input by the user, the communication device 12 may perform a subsequent communication with the communication device 11 and may measure the usable bandwidth between the communication devices 11 and 12. In response to the establishment request packet that was received at Step S13, the communication device 12 may provisionally transmit an acknowledgement (ACK). Hereinafter, the ACK that is provisionally transmitted in response to the establishment request packet may be referred to as the provisional ACK. The communication device 11 may receive the provisional ACK (Step S17). The official ACK in response to the establishment request packet may be transmitted at Step S29 (and will be described in detail below). Because the communication device 11 has not received the official ACK, the session between the communication devices 11 and 12 is in a state of not yet having been established. However, information (address information and the like) that is necessary for the communication between the communication devices 11 and 12 may be exchanged through the establishment request packet and the provisional ACK. Therefore, a state may exist in which the measurement communication between the communication devices 11 and 12 can be performed.

In a case where the communication device 11 has received the provisional ACK from the communication device 12 at Step S17, the communication device 11 transmits to the communication device 12 a packet that requests the performing of the measurement communication. Hereinafter, the packet that requests the performing of the measurement communication may be also referred to as the measurement request packet. The communication device 12 may receive the measurement request packet (Step S19). The communication device 12 may perform authentication of the communication device 11 by determining, using a method that is described below, whether to permit the measurement communication with the communication device 11 that transmitted the measurement request packet (Step S21).

In determining whether or not to permit the measurement communication with the communication device 11, the communication device 12 may refer to the first table 231 (refer to FIG. 3) that is stored in HDD 23. In addition, in determining whether or not to permit the measurement communication with the communication device 11, the communication device 12 may refer to the second table 232 (refer to FIG. 4). The communication device 12 may determine whether or not to permit the measurement communication with the communication device 11 by querying the server 14. The server 14 may determine whether or not to permit the communication device 12 to perform the measurement communication with the communication device 11 by referring to a third table 141 (refer to FIG. 5) that is stored in a HDD of the server 14. The first table 231, the second table 232, and the third table 141 will be explained below.

The first table 231 will be explained with reference to FIG. 3. Identification information (IDs) and permit/deny information are stored in association with one another in the first table 231. The IDs are the Session Initiation Protocol Uniform Resource Identifiers (SIP-URIs) of the communication devices 10, as well as aliases. The permit/deny information is information that indicates whether the measurement communication is permitted. The permit/deny information that permits the measurement communication is associated with the IDs of the communication devices 10 whose locations are clearly known. The permit/deny information that denies the measurement communication is associated with the IDs of the communication devices 10 whose locations are not clearly known. The first table 231 may be used in which the permit/deny information is associated with an address book that the communication device 12 controls, for example.

The second table 232 will be explained with reference to FIG. 4. IDs, history information, and permit/deny information are stored in association with one another in the second table 232. The IDs are the SIP-URIs of the communication devices 10. The history information includes histories that pertain to communications that have been performed with the other communication devices 10. Specifically, the history information includes descriptions of the communications and the dates and times of the communications. The permit/deny information that permits the measurement communication is associated with the IDs of the communication devices 10 with which the communication device 10 has communicated in the past. The permit/deny information that denies the measurement communication is associated with the IDs of the communication devices 10 with which the communication device 10 has not communicated in the past. Therefore, in a case where the description of the communication is "missed communication" or "communication denied", communication has not actually been performed, so the permit/deny information that denies the measurement communication is associated with the ID of the communication device 10. The second table 232 may be used in which the permit/deny information is associated with a communication record that is recorded in the communication device 12, for example.

The third table 141 will be explained with reference to FIG. 5. IDs and permit/deny information are stored in association with one another in the third table 141. The IDs are the SIP-URIs of the communication devices 10. The permit/deny information that denies the measurement communication is associated with the IDs of the communication devices 10 that, in the past, have requested the establishment of a session for the purpose of interfering with communication. The permit/deny information that permits the measurement communication is associated with the IDs of the communication devices 10 that have not done so.

Figure 2:
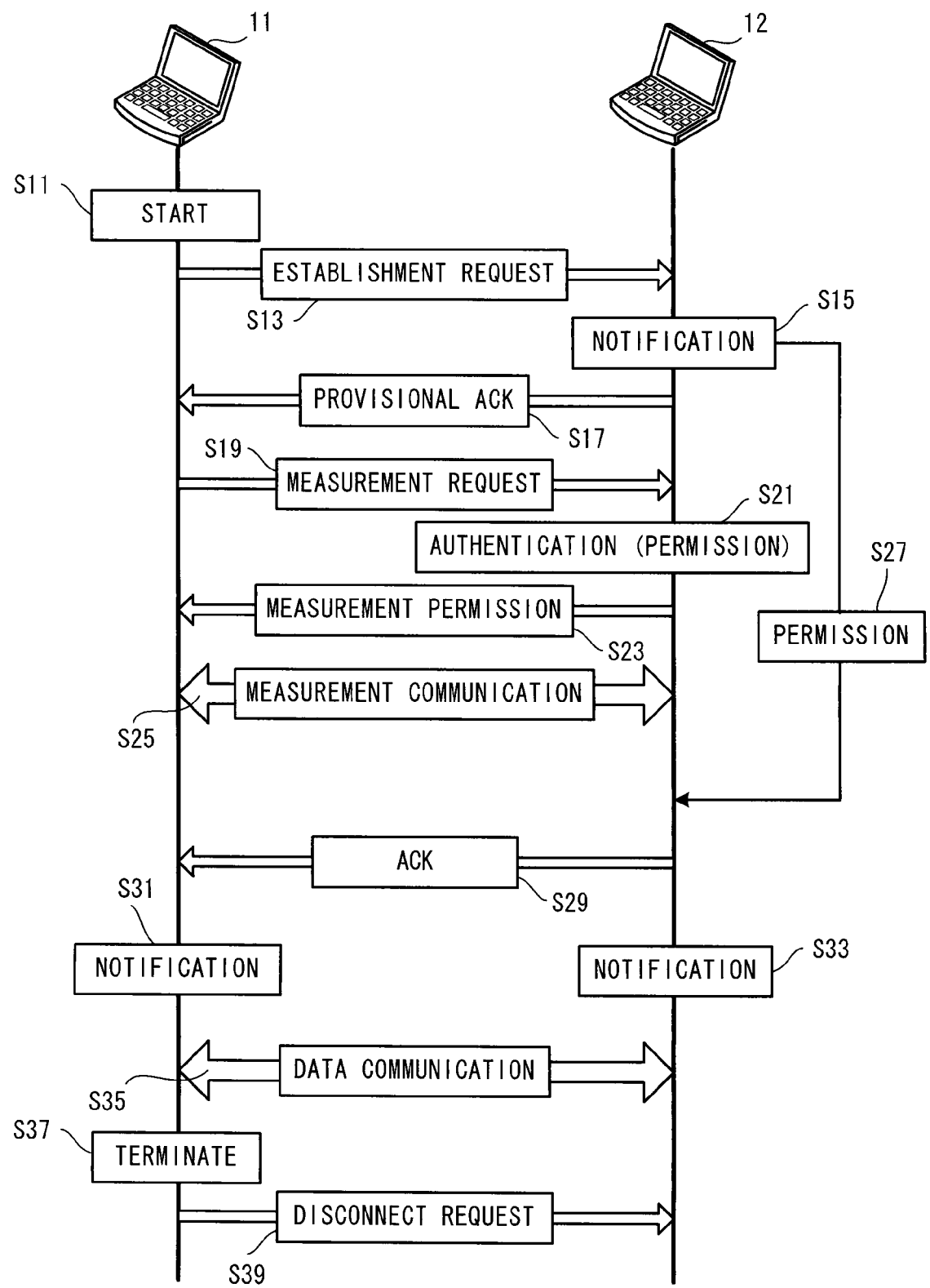
FIG. 2 is a figure that shows an example of a communication sequence.

As shown in FIG. 2, in a case where the communication device 12 has received the measurement request packet at Step S19, the communication device 12 specifies the SIP-URI of the transmission source for the received measurement request packet. The communication device 12 may refer to the first table 231, for example. In a case where the permit/deny information that permits the measurement communication is associated with the specified SIP-URI, the communication device 12 permits the measurement communication with the communication device 11 that transmitted the measurement request packet.

In a case where the measurement communication is permitted, the communication device 12 transmits to the communication device 11 a packet that permits the measurement communication. Hereinafter, the packet that permits the measurement communication may be referred to as the measurement permission packet. The communication device 11 may receive the measurement permission packet (Step S23). The measurement communication between the communication devices 11 and 12 may be started, and the usable bandwidth may be measured (Step S25). In the measurement communication, the usable bandwidth of the transmission channel in the direction from the communication device 11 to the communication device 12 and the usable bandwidth of the transmission channel in the direction from the communication device 12 to the communication device 11 may both be measured. These usable bandwidths may be measured at the same time. These usable bandwidths may be measured at different times.

On the other hand, in a case where the permit/deny information that denies the measurement communication is associated with the specified SIP-URI, the communication device 12 may make a final determination as to whether or not to perform the measurement communication, in accordance with a command that is input by the user. This will be described in detail below with reference to FIG. 6.

In a case where the specified SIP-URI is not stored in first table 231, the communication device 12 may refer to the second table 232. In a case where the permit/deny information that permits the measurement communication is associated with the specified SIP-URI, the communication device 12 permits the measurement communication with the communication device 11 that transmitted the measurement request packet. The communication device 12 may transmit the measurement permission packet to the communication device 11 (Step S23). The measurement communication between the communication devices 11 and 12 may be started, and the usable bandwidth may be measured (Step S25).

On the other hand, in a case where the permit/deny information that denies the measurement communication is associated with the specified SIP-URI in the second table 232, the communication device 12 may make a final determination as to whether or not the measurement communication may be performed, in accordance with a command that is input by the user. This will be described in detail below with reference to FIG. 6.

In a case where the specified SIP-URI is not stored in either the first table 231 or the second table 232, the communication device 12 may query the server 14 as to whether or not the measurement communication may be performed. The communication device 12 may provide notification of the specified SIP-URI to the server 14. The server 14 may refer to the third table 141. The server 14 may acquire the permit/deny information that is associated with the SIP-URI of which it was notified. The server 14 may transmit the acquired permit/deny information to the communication device 12. In a case where the SIP-URI of which the server 14 was notified is not stored in the third table 141, the server 14 transmits to the communication device 12 the permit/deny information that denies the measurement communication. The communication device 12 may receive the permit/deny information that has been transmitted from the server 14. In a case where the communication device 12 has received the permit/deny information that permits the measurement communication from the server 14, the communication device 12 permits the measurement communication with the communication device 11 that transmitted the measurement request packet. The communication device 12 may transmit the measurement permission packet to the communication device 11 (Step S23). The measurement communication between the communication devices 11 and 12 may be started, and the usable bandwidth may be measured (Step S25).

In a case where the communication device 12 has received the permit/deny information that denies the measurement communication from the server 14, the communication device 12 may make a final determination as to whether or not the measurement communication may be performed, in accordance with a command that is input by the user. This will be described in detail below with reference to FIG. 6.

As described above, the communication device 12 may determine whether or not to permit the measurement communication by referring to the first table 231 and the second table 232, and by querying the server 14. By determining whether or not to permit the measurement communication based on the plurality of the tables, the communication device 12 is able to reliably specify the communication device 10 with which to permit the measurement communication.

It is assumed that, in FIG. 2, the user, in accordance with the screen that was displayed on the display 25 at Step S15, makes an input that indicates that the establishment of the session is permitted (Step S27). After the measurement communication (Step S25) has ended and the usable bandwidth has been measured, the communication device 12 may transmit to the communication device 11 the official ACK in response to the establishment request packet that was received at Step S13. The communication device 11 may receive the official ACK (Step S29). The session may be established between the communication devices 11 and 12, and a state may be created in which data communication between the communication devices 11 and 12 can be performed freely. Notifications that indicate that it has become possible to perform video conferencing between the communication devices 11 and 12 may be provided to the users of the communication devices 11 and 12 (Steps S31, S33). The data communication may be performed between the communication devices 11 and 12 using the measured usable bandwidth (Step S35). The video conferencing may thus be performed.

It is assumed that a command to terminate the video conferencing has been input by the user of the communication device 11 (Step S37). The communication device 11 may transmit to the communication device 12 a disconnect request packet that requests that the session between the communication devices 11 and 12 be disconnected. The communication device 12 may receive the disconnect request packet (Step S39). The session between the communication devices 11 and 12 may be disconnected.

In a case where, in accordance with the screen that was displayed on the display 25 at Step S15, the user has made an input that indicates that the establishment of the session is denied, the communication device 12 does not transmit the official ACK to the communication device 11. The communication between the communication devices 11 and 12 may then be terminated, without the session being established between the communication devices 11 and 12.

In a case where the measurement communication between the communication devices 11 and 12 has been permitted by the authentication processing in the communication device 12 (FIG. 2, Step S21), the measurement communication is performed and the usable bandwidth is measured before the session is established (FIG. 2, Step S25). Further, in a case where the measurement communication has ended and an input has been made that indicates that the establishment of the session is permitted (FIG. 2, Step S27), the session is established (FIG. 2, Step S29), and the data communication between the communication devices 11 and 12 is started (FIG. 2, Step S35). Therefore, after the notifications have been provided that indicate that the session has been established (FIG. 2, Steps S31, S33), the user is able to immediately start the data communication that uses the measured usable bandwidth.

Ordinarily, communication between the communication devices 10 is enabled by establishing a session. Therefore, the usable bandwidth may be measured after the session has been established. However, with this method, the data communication cannot be performed while the measurement communication is being performed. Therefore, some time may elapse after the session is established until the data communication is actually enabled. In contrast to these, in the present embodiment, the measurement communication can be performed before the session is established. Therefore, the communication devices 11 and 12 are able to start the data communication under the optimum conditions, without making the user wait.

Figure 6:
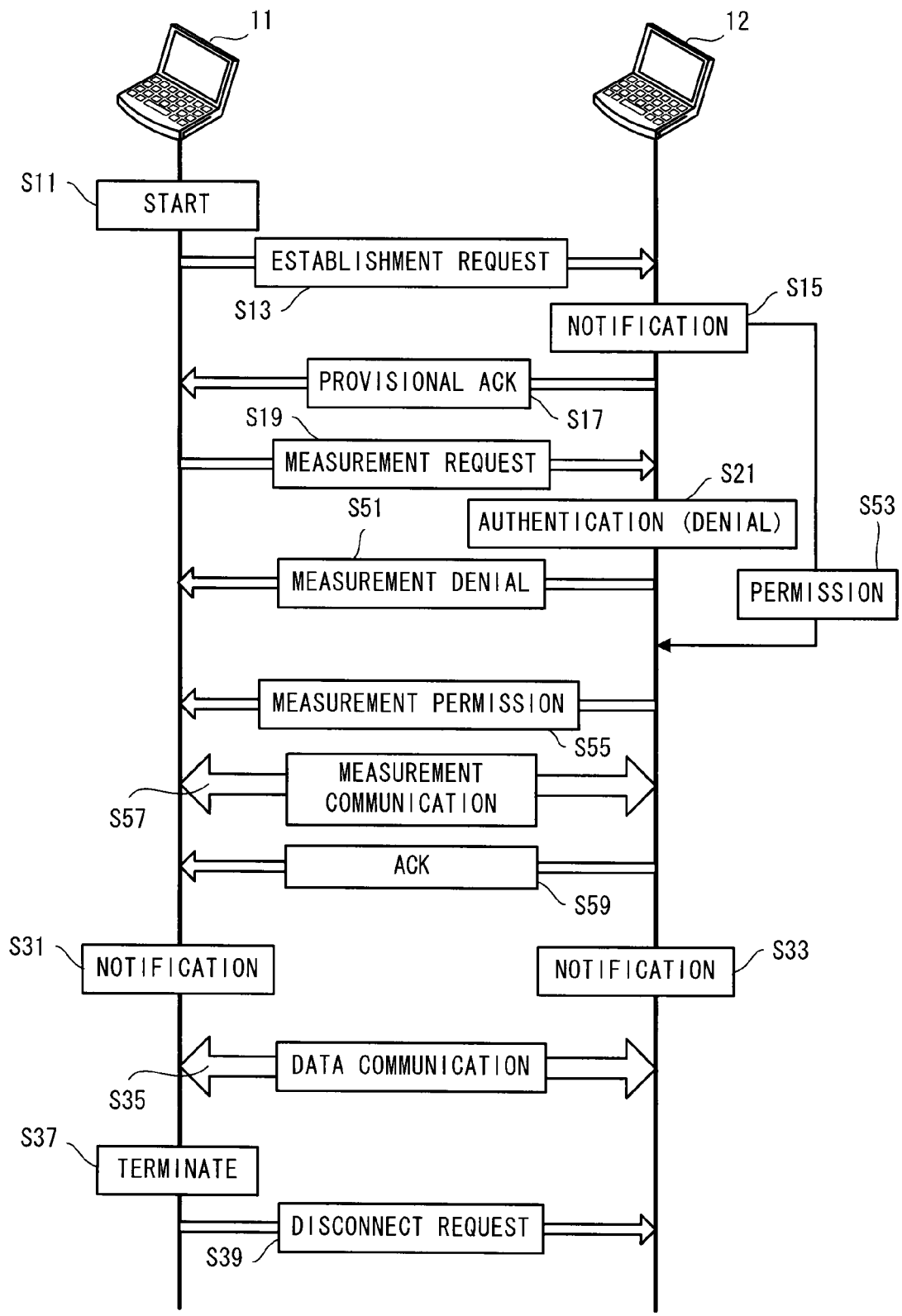
FIG. 6 is a figure that shows an example of a communication sequence.

The communication sequence in the case where the measurement communication is denied at Step S21 of the communication sequence that is shown in FIG. 2 will be explained with reference to FIG. 6. For the parts that are the same as in the communication sequence that is shown in FIG. 2, the same reference numerals are assigned, and the explanation may be omitted or simplified. In a case where the communication device 12 has received the measurement request packet from the communication device 11 (Step S19), first, the authentication of the communication device 11 is performed by referring to the first table 231 (Step S21). In a case where the SIP-URI that was specified by the received measurement request packet is not stored in first table 231, the authentication of the communication device 11 is performed by referring to the second table 232 (Step S21). In a case where the specified SIP-URI is not stored in the second table 232, the authentication of the communication device 11 is performed by querying the server 14 (Step S21).

In a case where the first table 231 is referenced, if the permit/deny information that denies the measurement communication is associated with the specified SIP-URI, a packet that denies the measurement communication is transmitted to the communication device 11 (Step S51). Hereinafter, the packet that denies the measurement communication may be referred to as the measurement denial packet. In this case, the measurement communication may not be performed unless a command to permit the establishment of the session is input (Step S53, described below). In this manner, the communication device 12 is able to prohibit the measurement communication with the communication device 11 with which the measurement communication is denied in the first table 231. The communication device 12 is thus able to prohibit the performing of the measurement communication with the communication devices 10 whose locations are not clearly known. Therefore, the measurement communication may be performed only with those communication devices 10 that are very safe, because their locations are clearly known. Accordingly, in a case where the establishment of the session is requested for the purpose of interfering with communication, it is possible to prevent the bandwidth measurement from being performed.

In a case where the second table 232 is referenced, if the permit/deny information that denies the measurement communication is associated with the specified SIP-URI, the measurement denial packet is transmitted to the communication device 11 (Step S51). In this case, the measurement communication may not be performed unless a command to permit the establishment of the session is input (Step S53, described below). In this manner, the communication device 12 is able to prohibit the measurement communication with the communication devices 10 with which the measurement communication is denied in the second table 232. The communication device 12 is thus able to perform the measurement communication only with those communication devices 10 with which the communication device 12 has performed communication in the past. The communication device 12 is also able to prohibit the performing of the measurement communication with those communication devices 10 with which the communication device 12 has not performed communication in the past. Therefore, the measurement communication may be performed only with those communication devices 10 that are very safe, because the communication device 12 has performed communication with the communication devices 10 in the past. Accordingly, in a case where the establishment of the session is requested for the purpose of interfering with communication, it is possible to prevent the bandwidth measurement from being performed.

In a case where the permit/deny information that denies the measurement communication has been received from the server 14, the measurement denial packet is transmitted to the communication device 11 (Step S51). In this case, the measurement communication may not be performed unless a command to permit the establishment of the session is input (Step S53, described below). In this manner, the communication device 12 is able to prohibit the measurement communication with the communication devices 10 with which the measurement communication has been denied by the server 14. The communication device 12 is thus able to prevent the bandwidth measurement from being performed in a case where there is a strong possibility that the establishment of the session has been requested for the purpose of interfering with communication. It is also possible for the communication device 12 to determine whether the measurement communication with the communication device 10 is permitted based on a common determination standard that is stored in the server 14. Therefore, for example, even for a different one of the communication devices 10 (for example, the communication device 13), the determination as to whether the measurement communication may be permitted or denied can be made by the same determination standard. Furthermore, updating the third table 141 that is stored in the HDD of the server 14 would make it possible for all of the communication devices 10 to make the determination according to the determination standard after the update. The permit/deny information can therefore be updated easily.

It is assumed that, in accordance with the screen that was displayed on the display 25 at Step S15, the user has input a command to deny the establishment of the session. In this case, the communication between the communication devices 11 and 12 may be terminated, without either the measurement communication or the establishment of the session being performed between the communication devices 11 and 12.

On the other hand, it is assumed that, in accordance with the screen that was displayed on the display 25 at Step S15, the user has input a command to permit the establishment of the session (Step S53). In this case, the communication device 12 establishes the session with the communication device 11 in accordance with the user's command, even after the communication device 12 determined to deny the measurement communication at Step S21 and transmitted the measurement denial packet to the communication device 11 at Step S51. In a case where the command to permit the establishment of the session has been input, the communication device 12 transmits the measurement permission packet to the communication device 11. The communication device 11 may receive the measurement permission packet (Step S55). The receiving of the measurement denial packet at Step S51 has caused the communication device 11 to determine that the measurement communication has been denied. However, the receiving of the measurement permission packet at Step S55 causes the measurement communication to be started between the communication devices 11 and 12, and the usable bandwidth may be measured (Step S57).

After the measurement communication has ended and the usable bandwidth has been measured, the communication device 12 may transmit to the communication device 11 the official ACK in response to the establishment request packet that was received at Step S13. The communication device 11 may receive the official ACK (Step S59). The session may be established between the communication devices 11 and 12. Notifications that indicate that it is possible to perform the video conferencing between the communication devices 11 and 12 may be provided to the users of the communication devices 11 and 12 (Steps S31, S33). The data communication may be performed between the communication devices 11 and 12 using the measured usable bandwidth (Step S35). The video conferencing may thus be performed.

As explained above, where the establishment of the session is permitted by the user, the communication device 12 can perform the measurement communication with the communication device 11, even in a case where the measurement communication has been denied by the authentication that uses the first table 231 and the second table 232, as well as by the authentication that uses the querying of the server 14. The convenience for the user who uses the communication device 12 can thus be enhanced.

Figure 7:
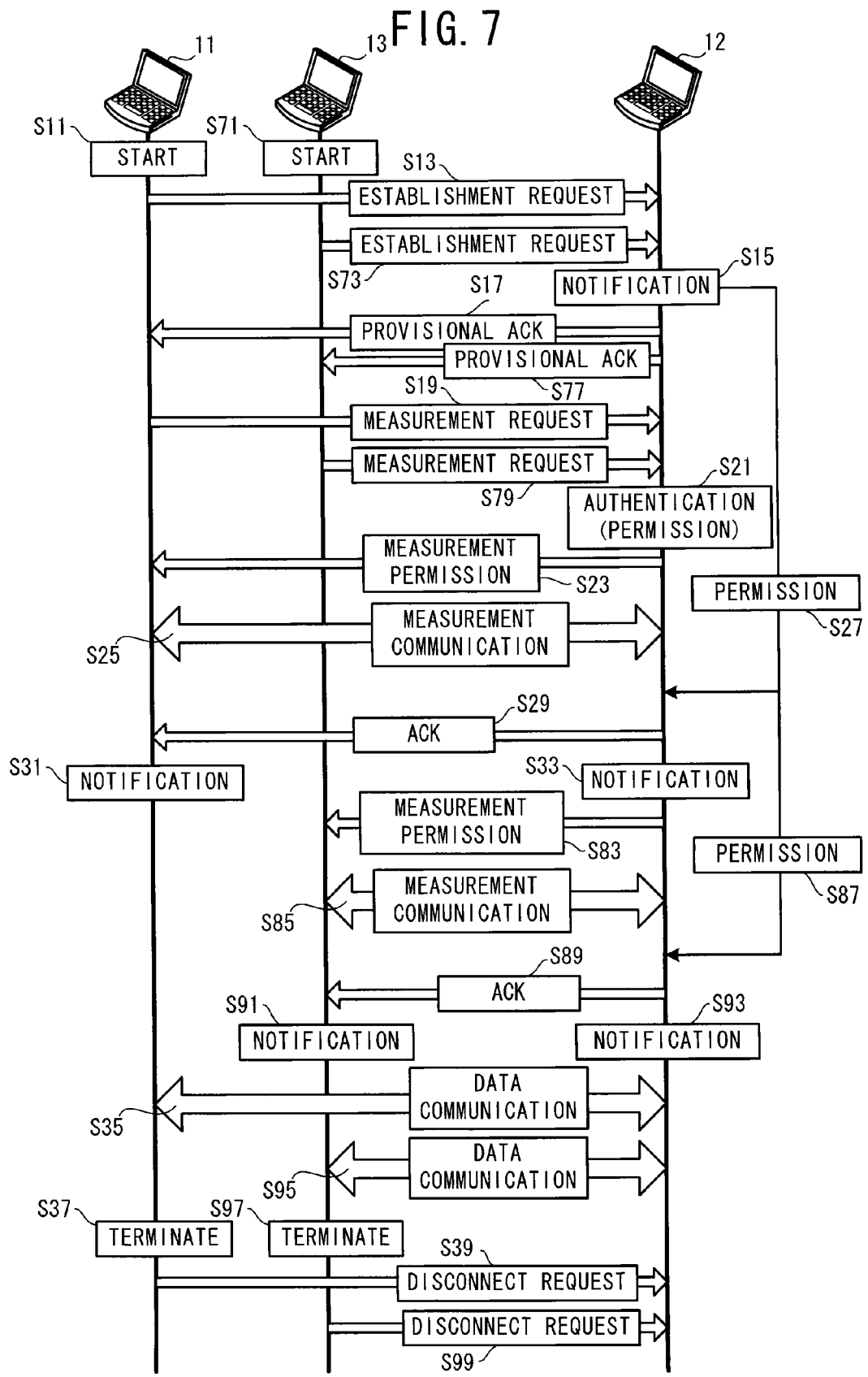
FIG. 7 is a figure that shows an example of a communication sequence.
Figure 8:
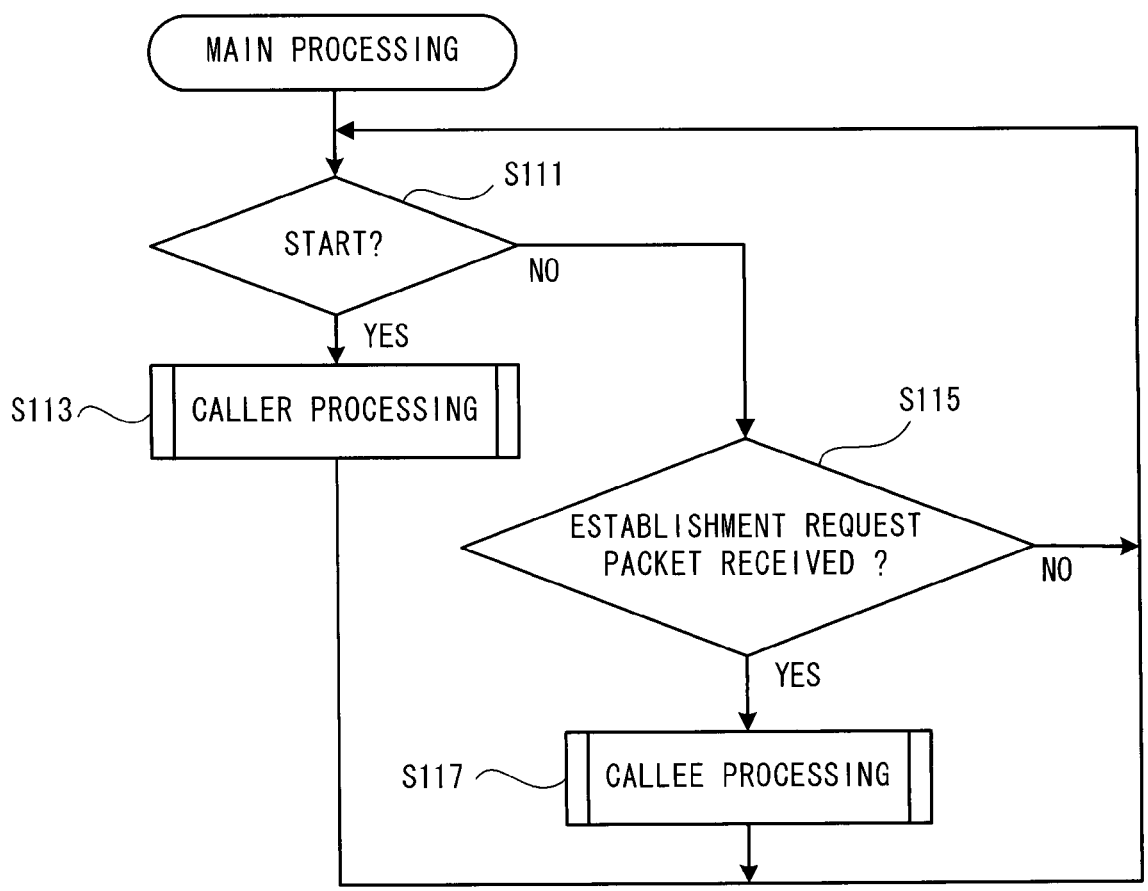
FIG. 8 is a flowchart that shows an example of main processing.

The communication sequence in a case where the usable bandwidth is measured between the communication device 12 and the communication devices 11, 13 and the data communication is started will be explained with reference to FIG. 7. For the parts that are the same as in the communication sequence that is shown in FIG. 2, the same reference numerals are assigned, and the explanation may be omitted or simplified.

It is assumed that the user of the communication device 11 and the user of the communication device 13 have each input, at the same time, a command to start a video conference with the communication device 12 (Steps S11, S71). The communication devices 11, 13 may transmit the establishment request packets to the communication device 12 (Steps S13, S73). The communication device 12 may receive the establishment request packets from the communication devices 11, 13 and may transmit the provisional ACKs back to the communication devices 11, 13 (Steps S17, S77). The communication devices 11, 13 may receive the provisional ACKs from the communication device 12 and may transmit the measurement request packets to the communication device 12 (Steps S19, S79). The communication device 12 may specify the SIP-URIs based on the establishment request packets that were received from the communication devices 11, 13. The communication device 12 may then authenticate the communication devices 11, 13 by referring to the first table 231 and the second table 232 (Step S21). Alternatively, the communication device 12 may authenticate the communication devices 11, 13 by querying the server 14 (Step S21). The various steps that have been explained up to this point are the same as in the communication sequence that is shown in FIG. 2.

It is assumed that the communication device 12 permits the measurement communication with the communication devices 11, 13. Here, in a case where the communication device 12 has transmitted the measurement permission packets to the communication devices 11, 13 at the same time, the possibility exists that the measurement communication between the communication devices 11 and 12 and the measurement communication between the communication devices 12 and 13 may be performed at the same time. In that case, an extremely large number of the measurement packets may be present within the network 2. Therefore, the possibility exists that it may not be possible to measure the usable bandwidth accurately.

Accordingly, the communication device 12 may perform regulation such that the measurement communication between the communication devices 11 and 12 and the measurement communication between the communication devices 12 and 13 may not overlap. First, the communication device 12 may transmit the measurement permission packet to the communication device 11. The communication device 11 may receive the measurement permission packet (Step S23). The measurement communication between the communication devices 11 and 12 may be started, and the usable bandwidth may be measured (Step S25). At this point, it is assumed that, in accordance with the screen that was displayed on the display 25 at Step S15, the user has made an input that indicates that the establishment of the session with the communication device 11 is permitted (Step S27). After the measurement communication with the communication device 11 has ended and the usable bandwidth has been measured, the communication device 12 may transmit to the communication device 11 the official ACK in response to the establishment request packet that was received at Step S13. The communication device 11 may receive the official ACK (Step S29). The session may be established between the communication devices 11 and 12, and a state may be created in which data communication between the communication devices 11 and 12 can be performed freely. The communication devices 11 and 12 may provide to the users of the communication devices 11 and 12 notifications that indicate that it has become possible to perform video conferencing between the communication devices 11 and 12 (Steps S31, S33).

Next, the communication device 12 may transmit the measurement permission packet to the communication device 13. The communication device 13 may receive the measurement permission packet (Step S83). The measurement communication between the communication devices 12 and 13 may be started, and the usable bandwidth may be measured (Step S85). At this point, it is assumed that, in accordance with the screen that was displayed on the display 25 at Step S15, the user of the communication device 12 has made an input that indicates that the establishment of the session with the communication device 13 is permitted (Step S87). After the measurement communication with the communication device 13 has ended and the usable bandwidth has been measured, the communication device 12 may transmit to the communication device 13 the official ACK in response to the establishment request packet that was received at Step S73. The communication device 13 may receive the ACK (Step S89). The session may be established between the communication devices 12 and 13, and a state may be created in which data communication between the communication devices 12 and 13 can be performed freely. The communication devices 12 and 13 may provide to the users of the communication devices 12 and 13 notifications that indicate that it has become possible to perform video conferencing between the communication devices 12 and 13 (Steps S91, S93).

In a case where the sessions have been established between the communication devices 11 and 12 and between the communication devices 12 and 13, respectively, the data communication between the communication devices 11 and 12 may be performed using the measured usable bandwidth (Step S35). Then the data communication between the communication devices 12 and 13 may be performed (Step S95). In this manner, the video conferencing may be performed among the communication devices 11, 12, 13.

It is assumed that commands to terminate the video conferencing have been input by the users of the communication devices 11 and 13 (Steps S37, S97). The communication devices 11 and 13 may transmit the disconnect request packets to the communication device 12 (Steps S39, S99). The session between the communication devices 11 and 12 may be disconnected. The session between the communication devices 12 and 13 may be disconnected.

As described above, in a case where the communication device 12 performs the measurement communications with the communication devices 11, 13, the communication device 12 is able to control the timings of the respective measurement communications such that the measurement communication with the communication device 11 and the measurement communication with the communication device 13 do not overlap. This makes it possible for the communication device 12 to accurately measure the usable bandwidths of the transmission channels with the communication devices 11, 13.

Main processing that is performed by the CPU 20 of the communication device 10 will be explained with reference to FIGS. 8 to 11. The main processing may be launched and performed when the power supply of the communication device 10 is turned on. The processing that is hereinafter described is performed by the CPU 20.

A determination is made as to whether a command has been input to the communication device 10 to start video conferencing with another communication device 10 (Step S111). In a case where a command to start video conferencing has been input (YES at Step S111), caller processing (refer to FIG. 9) is performed (Step S113). The caller processing may establish a session with the other communication device 10 by transmitting the establishment request packet to the other communication device 10. The details of the caller processing will be described below. After the caller processing ends, the processing returns to Step S111. Hereinafter, the communication device 10 that performs the caller processing may be referred to as the caller device.

If the command to start the video conferencing has not been input (NO at Step S111), a determination is made as to whether an establishment request packet has been received that was transmitted from a caller device (Step S115). If the establishment request packet has been received (YES at Step S115), callee processing is performed (Step S117; refer to FIGS. 10, 11). The callee processing is processing that, in addition to performing authentication of the caller device that transmitted the establishment request packet, establishes the session with the caller device and starts the data communication. The details of the callee processing will be described below. After the callee processing ends, the processing returns to Step S111. Hereinafter, the communication device 10 that performs the callee processing may be referred to as the callee device. If the establishment request packet has not been received (NO at Step S115), the processing returns to Step S111.

Figure 9:
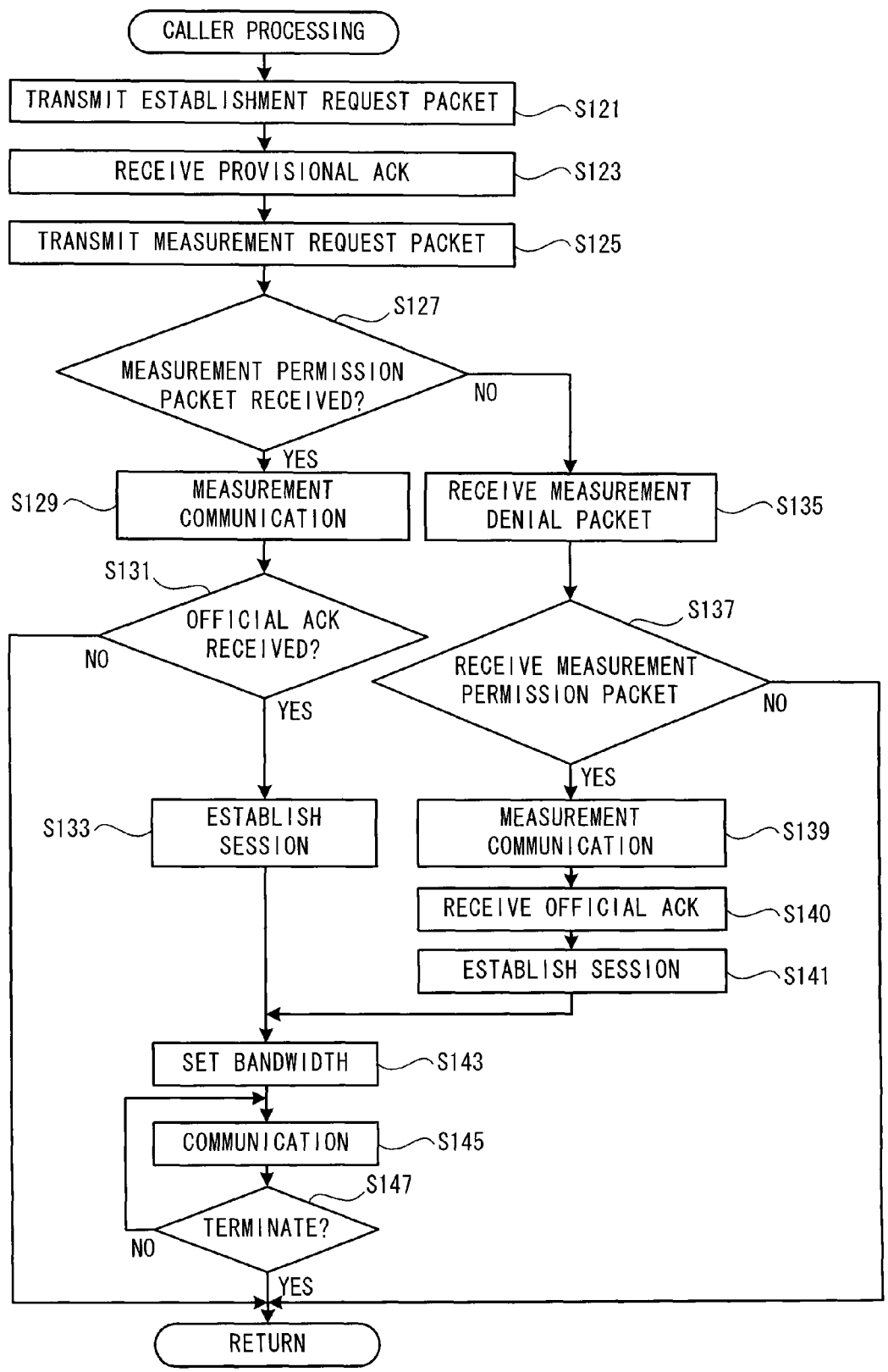
FIG. 9 is a flowchart that shows an example of caller processing.

The caller processing will be explained with reference to FIG. 9. The callee device may be specified based on an ID that is input to the caller device together with the command to start the video conferencing. The establishment request packet may be transmitted to the callee device (Step S121). The provisional ACK that is transmitted from the callee device may be received (Step S123). The measurement request packet may be transmitted to the callee device in order to request the measurement communication with the callee device (Step S125).

A determination is made as to whether the measurement permission packet has been received from the callee device (Step S127). In a case where the measurement permission packet has been received from the callee device (YES at Step S127), it signifies that the performing of the measurement communication with the caller device has been permitted by the callee device. In this case, the measurement communication is performed with the callee device (Step S129), and the usable bandwidth of the transmission channel between the caller device and the callee device is measured.

A determination is made as to whether the official ACK has been received from the callee device (Step S131). In a case where the official ACK has not been received from the callee device (NO at Step S131), it signifies that the establishment of the session between the caller device and the callee device has been denied by the called side device. In this case, the caller processing is terminated without the session being established with the callee device, and the processing at Step S111 (refer to FIG. 8) is performed.

On the other hand, in a case where the official ACK has been received from the callee device (YES at Step S131), it signifies that the establishment of the session between the caller device and the callee device has been permitted by the callee device. The session is established with the callee device (Step S133). The usable bandwidth that was measured at Step S129 is set as the bandwidth that may be used during the data communication (Step S143). The data communication may be performed with the callee device (Step S145). The video conferencing with the callee device may thus be performed.

A determination is made as to whether a command has been input to the caller device to terminate the video conferencing that is being performed (Step S147). If the command to terminate the video conferencing has not been input (NO at Step S147), the processing at Step S145 is performed, and the video conferencing is continued. If the command to terminate the video conferencing has been input (YES at Step S147), the disconnect request packet is transmitted to the callee device. The session with the callee device is thus disconnected. The caller processing is terminated, and the processing at Step S111 (refer to FIG. 8) is performed.

In a case where the measurement permission packet could not be received in response to the measurement request packet that was transmitted at Step S125 (NO at Step S127), it signifies that the performing of the measurement communication with the caller device has been denied by the callee device. In this case, the measurement denial packet may be received that is transmitted from the callee device (Step S135).

Even in a case where the measurement communication has been denied by the callee device, the establishment of the session between the caller device and the callee device may be permitted by the user of the callee device. In that case, when the establishment of the session is permitted by the callee device, the measurement permission packet may be transmitted from the callee device to the caller device (Step S177; refer to FIG. 11). A determination is made as to whether the measurement permission packet has been received from the callee device (Step S137). In a case where the measurement permission packet has not been received (NO at Step S137), it signifies that the establishment of the session between the caller device and the callee device has been denied by the callee device. In this case, the caller processing is terminated without the session being established with the callee device, and the processing at Step S111 (refer to FIG. 8) is performed.

On the other hand, in a case where the measurement permission packet has been received from the callee device (YES at Step S137), it signifies that the establishment of the session between the caller device and the callee device has been permitted by the callee device, even though the measurement communication was denied. The measurement communication with the callee device is performed (Step S139), and the usable bandwidth of the transmission channel between the caller device and the callee device is measured. After the measurement communication has ended, the official ACK may be received from the callee device (Step S140). The session may be established with the callee device (Step S141).

The usable bandwidth that was measured at Step S139 is set as the bandwidth that may be used during the data communication (Step S143). The data communication is performed with the callee device (Step S145). The video conferencing with the callee device is thus performed. If the command to terminate the video conferencing has been input (YES at Step S147), the disconnect request packet is transmitted to the callee device. The session with the callee device is thus disconnected. The caller processing is terminated, and the processing at Step S111 is performed.

Figure 10:
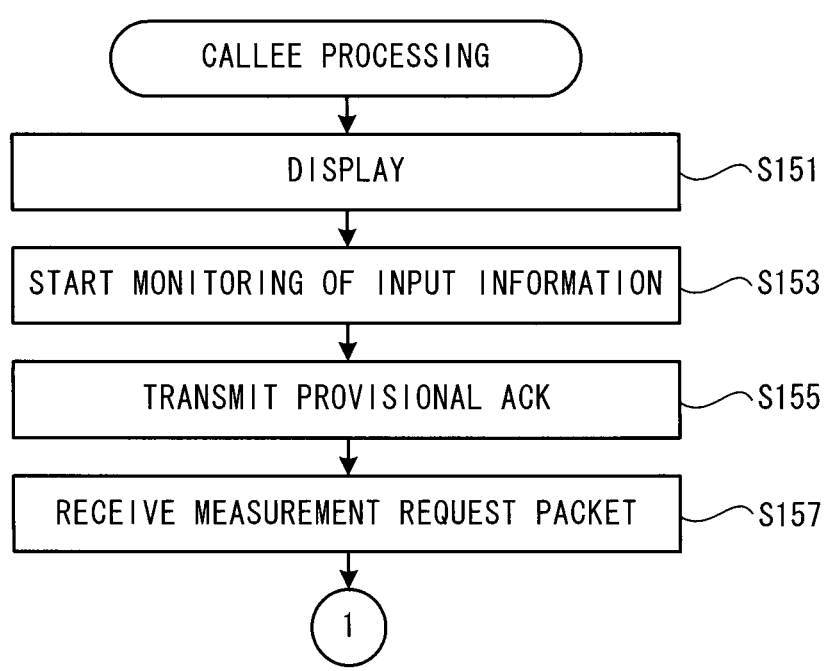
FIG. 10 is a part of a flowchart that shows an example of callee processing.

Next, the callee processing will be explained with reference to FIGS. 10 and 11. It is assumed that the establishment request packet has been received from the caller device at Step S115 (refer to FIG. 8). In this case, as shown in FIG. 10, a message that indicates that the request for the establishment of the session was received from the caller side device is displayed on the display 25 together with the ID of the caller device (Step S151). In a case where a plurality of the establishment request packets were received from a plurality of the caller devices at Step S115, the ID of each of the plurality of the caller devices is displayed on the display 25 (Step S151). A screen on which a command to permit or deny the establishment of the session with the caller device can be input is also displayed on the display 25 (Step S151).

Monitoring of information that is input through the input portion 24 is started (Step S153). Thereafter, in a case where information is input through the input portion 24, the information that is input is automatically stored in the RAM 22. The provisional ACK is transmitted to the caller device (Step S155). In a case where a plurality of the establishment request packets were received from a plurality of the caller devices at Step S115, the provisional ACKs are transmitted to all of the caller devices that transmitted the establishment request packets (Step S155). The measurement request packet may be received from the caller device to which the provisional ACK was transmitted (Step S157).

Figure 11:
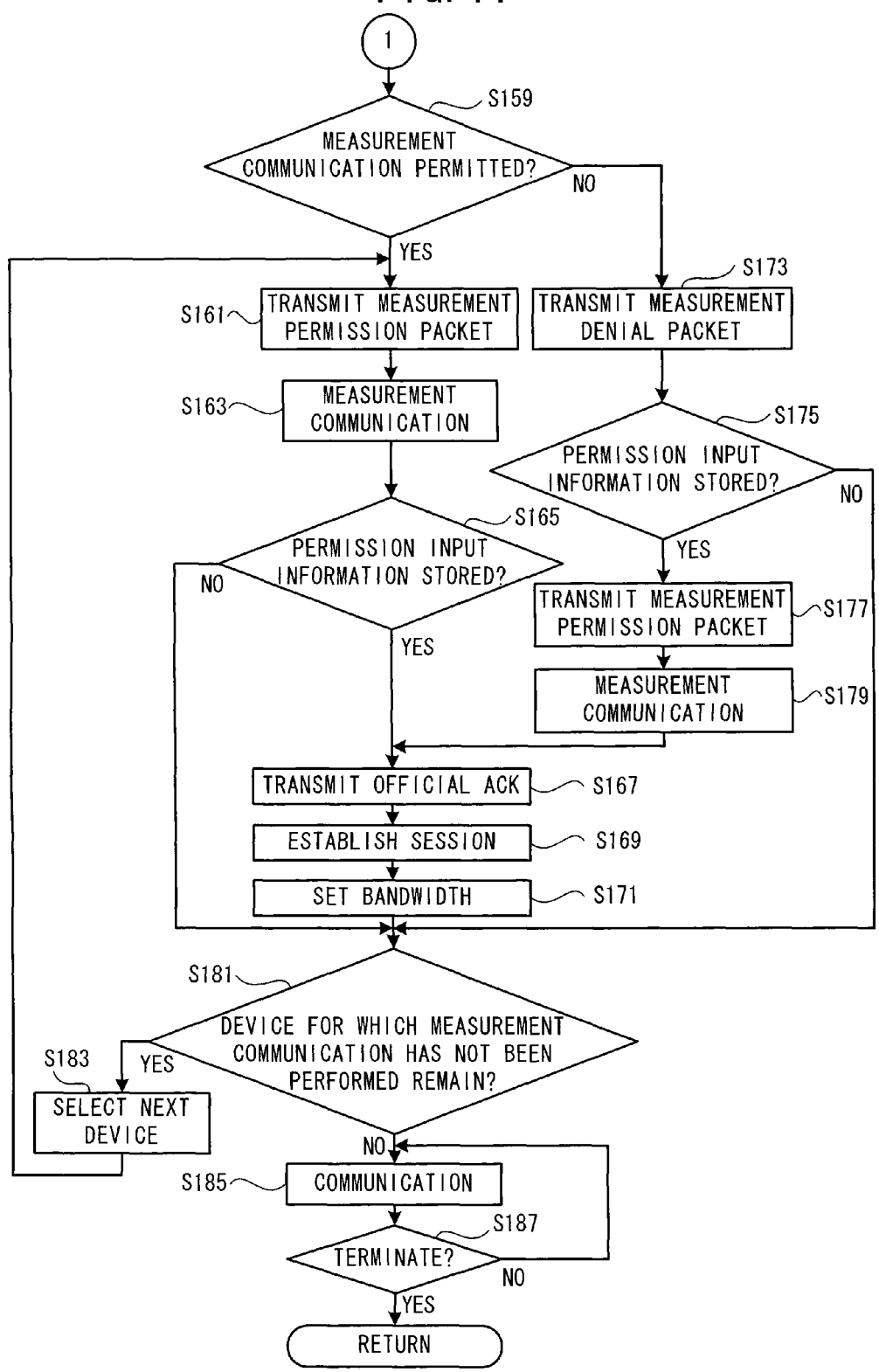
FIG. 11 is another part of the flowchart that shows an example of the callee processing.

As shown in FIG. 11, a determination is made as to whether the performing of the measurement communication is permitted with the caller device that transmitted the measurement request packet (Step S159). The SIP-URI of the caller device may be specified based on the received measurement request packet. The first table 231 and the second table 232 may be referenced in that order. In a case where the permit/deny information that permits the measurement communication is associated with the specified SIP-URI, the measurement communication with the caller device is permitted (YES at Step S159). The measurement communication with the caller device is permitted (YES at Step S159) in a case where the permit/deny information that permits the measurement communication has been received from the server 14. On the other hand, in a case where the result of the referencing of at least one of the first table 231 and the second table 232 is that the permit/deny information that denies the measurement communication is associated with the specified SIP-URI, the measurement communication with the caller device is denied (NO at Step S159). The measurement communication with the caller device is denied (NO at Step S159) in a case where the permit/deny information that denies the measurement communication has been received from the server 14.

In a case where the caller device with which the measurement communication is permitted exists (YES at Step S159), the measurement permission packet is transmitted to the caller device with which the measurement communication is permitted (Step S161). In a case where a plurality of the caller devices exist with which the measurement communication is permitted, one of the caller devices with which the measurement communication is permitted may be selected, and the measurement permission packet may be transmitted to that device (Step S161). The caller device that has the lowest identification number, for example, may be selected as the caller device to which the measurement permission packet is transmitted. The measurement communication is performed with the caller device to which the measurement permission packet has been transmitted (Step S163). The usable bandwidth of the transmission channel between the caller device and the callee device is measured.

A determination is made as to the nature of the input information that is stored in the RAM 22 as a result of the monitoring of the input information that was started at Step S153 (refer to FIG. 10) (Step S165). In a case where information that indicates that the establishment of the session between the caller device and the callee device for which the measurement communication was performed at Step S163 is denied is stored in the RAM 22 (NO at Step S165), it signifies that an input that indicates that the establishment of the session is denied was made to the callee device. In this case, the processing at Step S181, which will be described below, is performed without the session being established between the communication device 10 and the caller device that performed the measurement communication at Step S163.

In a case where information that indicates that the establishment of the session between the caller device and the callee device for which the measurement communication was performed at Step S163 is permitted is stored in the RAM 22 (YES at Step S165), it signifies that an input that indicates that the establishment of the session is permitted was made to the callee device. The official ACK is transmitted to the caller device that performed the measurement communication (Step S167). The session is established between the caller device and the callee device for which the measurement communication was performed (Step S169). The usable bandwidth that was measured at Step S163 is set as the bandwidth that may be used during the data communication with the caller device for which the measurement communication was performed (Step S171).

In a case where the measurement communication with a plurality of the caller devices was permitted at Step S159, a determination is made as to whether the measurement communication has been performed with all of the caller devices with which the measurement communication is permitted (Step S181). In a case where a caller device remains for which the measurement communication has not been performed (YES at Step S181), one of the caller devices for which the measurement communication has not yet been performed is selected as the caller device that may perform the measurement communication next (Step S183). The processing returns to Step S161, and the measurement communication is performed with the selected caller device. On the other hand, in a case where the measurement communication has been performed with all of the caller devices with which the measurement communication is permitted (NO at Step S181), the data communication may be performed with all of the caller devices with which the sessions have been established (Step S185). The video conferencing may thus be performed with the caller devices.

A determination is made as to whether a command has been input to the callee device to terminate the videoconferencing that is being performed (Step S187). If the command to terminate the video conferencing has not been input (NO at Step S187), the processing at Step S185 is performed, and the video conferencing is continued. If the command to terminate the video conferencing has been input (YES at Step S187), the session with the caller device is thus disconnected by the transmitting of the disconnect request packet to the caller device. The callee processing is terminated, and the processing at Step S111 (refer to FIG. 8) is performed.

On the other hand, in a case where, as the result of the determination at Step S159, a caller device exists for which the measurement communication has been denied (NO at Step S159), the measurement denial packet is transmitted to the caller device for which the measurement communication has been denied (Step S173). In a case where a plurality of the caller devices exist for which the measurement communication has been denied, the measurement denial packets are transmitted to all of the caller devices for which the measurement communication has been denied (Step S173).

A determination is made as to the nature of the input information that is stored in the RAM 22 as a result of the monitoring of the input information that was started at Step S153 (refer to FIG. 10) (Step S175). In a case where information is stored in the RAM 22 that denies the establishment of the session between the callee device and the caller device to which the measurement denial packet was transmitted at Step S173 (NO at Step S175), it signifies that an input that indicates that the establishment of the session is denied was made to the callee device. In this case, the processing at Step S181 is performed without the session being established between the callee device and the caller device to which the measurement denial packet was transmitted at Step S173.

On the other hand, in a case where information is stored in the RAM 22 that permits the establishment of the session between the callee device and the caller device to which the measurement denial packet was transmitted at Step S173 (YES at Step S175), it signifies that an input that indicates that the establishment of the session is permitted was made to the callee device, even though the measurement communication was denied at Step S159. The measurement permission packet is transmitted to the caller device with which the establishment of the session has been permitted (Step S177). The measurement communication is performed between the callee device and the caller device to which the measurement permission packet was transmitted (Step S179). The usable bandwidth of the transmission channel between the caller device and the callee device is measured. The processing advances to Step S167.

In order to establish the session between the callee device and the caller device that performed the measurement communication, the official ACK is transmitted to the caller device that performed the measurement communication (Step S167). The session is established with the caller device for which the measurement communication was performed (Step S169). The usable bandwidth that was measured at Step S179 is set as the bandwidth that may be used during the data communication with the caller device for which the measurement communication was performed (Step S171). After the measurement communication has been performed between the callee device and all of the caller devices (NO at Step S181), the data communication is performed with all of the caller devices with which the sessions have been established (Step S185). The videoconferencing may thus be performed with the callee device.

As explained above, in a case where the callee device has received the establishment request packet from a caller device that meets the specified conditions, the callee device may measure the usable bandwidth of the transmission channel with the caller device. Furthermore, in a case where the command to permit the establishment of the session has been input by the user, the callee device may perform the data communication with the caller device using the measured usable bandwidth. Therefore, the callee device can prevent the bandwidth measurement from being performed with a communication device 10 that requests the establishment of the session for the purpose of interfering with communication. This makes it possible for the callee device to accurately measure the usable bandwidth with the desired caller device and to perform communication using the measured usable bandwidth.

The present invention is not limited to the embodiment that is described above, and various types of modifications can be made. In the embodiment that is described above, the establishment request packet may be transmitted from the caller device to the callee device, and then the measurement request packet may be transmitted. The caller device may thus make the request for the measurement communication to the callee device. However, the present disclosure is not limited to this example. The caller device may request the establishment of the session and request the measurement communication by transmitting a single packet to the callee device. The callee device may transmit a single packet to the caller device instead of transmitting the provisional ACK and the measurement permission packet or transmitting the provisional ACK and the measurement denial packet. The callee device may thus provide notification of permitting or denying the measurement communication to the caller device.

The caller device may append, to the measurement request packet, key information that is determined in advance with the callee device, and then may transmit the measurement request packet to the callee device. In a case where the specified key information has been appended to the received measurement request packet, the callee device may permit the measurement communication with the caller device that transmitted the measurement request packet. The callee device may determine whether or not to permit the measurement communication with the caller device by querying the server 14 about the appended key information. The caller device may perform communication with the server 14 and acquire specified data in advance, such as a digital certificate or the like, for example. The caller device may append the acquired specified data to the measurement request packet and then may transmit the measurement request packet to the callee device. The callee device may determine whether or not to permit the measurement communication with the caller device by providing the server 14 with the specified data that are appended to the received measurement request packet and querying the server 14 about the specified data.

When determining whether or not to permit the measurement communication, the callee device may refer to the second table 232 first, and then refer to the first table 231. The callee device may download the third table 141 from the server 14 in advance. The callee device may determine whether or not to permit the measurement communication based on the downloaded third table 141.

In a case where the callee device performs the measurement communication with a plurality of the caller devices, the callee device may also append, to each of the measurement permission packets, sequence information, such as a sequence number, to indicate the order in which the measurement communication may be performed. The measurement permission packets to which the sequence information has been appended may also be transmitted to the corresponding caller devices at the same time. Each of the caller devices may then start the measurement communication with the callee device after waiting for a period of the time that is computed by multiplying the sequence number that is indicated by the sequence information that is appended to the measurement permission packet by a specified time interval. By allocating a different sequence number to each of the plurality of the caller devices, the callee device can prevent the measurement communications from overlapping, in the same manner as in the embodiment that is described above.

In the embodiment that is described above, the measured usable bandwidth may be used after the session has been established between the caller device and the callee device. The communication between the caller device and the callee device may be performed after the session has been established between the caller device and the callee device. The present disclosure is not limited to this example. For example, for data that occupy a small bandwidth during communication, such as audio data or the like, the communication between the caller device and the callee device may be performed before the session is established. For the data that occupy a large bandwidth during communication, such as video data or the like, the communication that uses the usable bandwidth may be performed after the session has been established.

The establishment request packet that is described above may correspond to an INVITE in the Session Initiation Protocol (SIP). Further, the provisional ACK may correspond to a 180 Ringing. The official ACK may correspond to a 2000K.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A communication device comprising:
   a first storage portion that stores identification information, the identification information identifying a communication device with which measurement of a transmission channel bandwidth is permitted, the transmission channel bandwidth being a usable bandwidth in a transmission channel with another communication device via a network; and
   a controller configured to control the communication device to:
      receive an establishment request from each of a plurality of communication devices, the establishment request requesting establishment of a session;
      perform a first determination including determining whether to permit measurement of the transmission channel bandwidth, based on whether identification information of each of the plurality of communication devices that transmitted the establishment request is stored in the first storage portion; and
      select, as a session establishment sequence, one of a first sequence and a second sequence, the first sequence being selected in response to determining, in the first determination, that the measurement of the transmission channel bandwidth to and from a specific device is permitted, the second sequence being selected in response to determining, in the first determination, that measurement of the transmission channel bandwidth to and from the specific device is not permitted, and the specific device being one of the plurality of communication devices,
   wherein the first sequence comprises:
      performing a first measurement including measuring the transmission channel bandwidth to and from the specific device;
      performing a second determination after the first measurement has performed, the second determination including determining whether permission input has been received for the specific device, the permission input permitting establishment of the session;
      establishing the session between the communication device and the specific device in response to determining, in the second determination, that the permission input has been received without establishing the session between the communication device and the specific device in response to determining, in the second determination, that the permission input has not been received; and
      setting the usable bandwidth for the data communication based on the measurement of the transmission channel bandwidth to and from the specific device performed in the first measurement, and
   wherein the second sequence comprises:
      performing a third determination including determining whether the permission input has been received for the specific device;
      performing a second measurement including measuring the transmission channel bandwidth to and from the specific device in response to determining, in the third determination, that the permission input has been received without measuring the transmission channel bandwidth to and from the specific device in response to determining, in the third determination, that the permission input has not been received;
      establishing the session between the communication device and the specific device in response to determining, in the third determination, that the permission input has been received without establishing the session between the communication device and the specific device in response to determining, in the third determination, that the permission input has not been received; and
      setting the usable bandwidth for the data communication based on the measurement of the transmission channel bandwidth to and from the specific device performed in the second measurement.

2. The communication device according to claim 1, wherein:
   the controller is further configured to control the communication device to:
      perform a first provision of a first notification to the specific device in response to determining, in the first determination, that the measurement of the transmission channel bandwidth is not permitted, the first notification indicating that the measurement of the transmission channel bandwidth is not permitted; and
      perform a second provision of a second notification to the specific device in response to determining, in the first determination, that the measurement of the transmission channel bandwidth is permitted, the second notification indicating that the measurement of the transmission channel bandwidth is permitted, and
   the first measurement includes:
      measuring the transmission channel bandwidth to and from the specific device to which the second notification has been provided in the second provision.

3. The communication device according to claim 1, wherein:
   the controller is further configured to control the communication device to:
      perform a first provision including providing a first notification to the specific device in response to determining, in the first determination, that the measurement of the transmission channel bandwidth is not permitted, the first notification indicating that the measurement of the transmission channel bandwidth is not permitted;

perform a second provision including providing a second notification to the specific device in response to determining, in the first determination, that the measurement of the transmission channel bandwidth is permitted, the second notification indicating that the measurement of the transmission channel bandwidth is permitted; and perform a third provision including providing the second notification to the specific device in response to determining that the first notification has been provided to the specific device in the first provision and in response to determining, in the third determination, that the permission input has been received, and the second measurement includes:
measuring the transmission channel bandwidth to and from the specific device to which the second notification has been provided in the third provision.

4. The communication device according to claim 1, further comprising:

a second storage portion that stores identification information, the identification information stored in the second storage portion identifying a communication device with which communication has been performed in the past, wherein the first determination includes:
determining whether to permit the measurement of the transmission channel bandwidth, based on whether identification information of at least one of the plurality of communication devices that transmitted the establishment request is stored in the second storage portion, in response to determining that the identification information of the at least one of the plurality of communication devices is not stored in the first storage portion.

5. The communication device according to claim 1, wherein the first determination includes:

determining, by querying a server, whether to permit the measurement of the transmission channel bandwidth to and from at least one of the plurality of communication devices that transmitted the establishment request, in response to determining that identification information of the at least one of the plurality of communication devices is not stored in the first storage portion, the server being connected to the network, and the server being configured to specify a communication device with which the measurement of the transmission channel bandwidth is permitted.

6. The communication device according to claim 1, wherein the first measurement includes:

measuring the transmission channel bandwidth to and from a plurality of communication devices one at a time and in order, in response to determining, in the first determination, that the plurality of communication devices are permitted to measure the transmission channel bandwidth.

7. The communication device according to claim 1, wherein:

the controller is further configured to control the communication device to:
perform a first transmission, the first transmission including transmitting first permission information to each of the plurality of communication devices that transmitted the establishment request, the first permission information configured to temporarily permit communication for measurement of the transmission channel bandwidth; and perform a second transmission, the second transmission including transmitting second permission information to the specific device in response to one of: determining, in the second determination, that the permission input has been received, and performing the second measurement, the second permission information configured to permit the establishment of the session with each of the first device and the second device, the first determination includes:
determining whether to permit the measurement of the transmission channel bandwidth in response to transmission of the first permission information in the first transmission, and the controller is further configured to control the communication device to communicate with the specific device with which the session has been established using the measured transmission channel bandwidth in response to transmission of the second permission information in the second transmission.

8. The communication device according to claim 7, wherein the controller is further configured to control the communication device to:

perform a first provision, the first provision including providing a first notification to the specific device, in response to determining, in the first determination, that the measurement of the transmission channel bandwidth is not permitted, the first notification indicating that the measurement of the transmission channel bandwidth is not permitted.

9. The communication device according to claim 8, wherein:

the second measurement includes:
measuring the transmission channel bandwidth to and from the specific device in response to transmitting the first permission information, and the second transmission includes:
transmitting the second permission information to the specific device in response to receiving the establishment request and in response to measuring the transmission channel bandwidth to and from the specific device.

10. The communication device according to claim 1, wherein:

the first determination includes:
determining whether to permit the measurement of the transmission channel bandwidth between the communication device and each of the plurality of communication devices via the network using peer-to-peer communication, the first measurement includes:
measuring the transmission channel bandwidth to and from the specific device via the network using the peer-to-peer communication, the second measurement includes:
measuring the transmission channel bandwidth to and from the specific device via the network using the peer to peer communication, and the controller is further configured to control the communication device to:

communicate with the specific device with which the session has been established using the measured transmission channel bandwidth using the peer-to-peer communication.

11. A method of controlling a communication device, the method comprising:

receiving an establishment request from each of a plurality of communication devices, the establishment request requesting establishment of a session;

performing a first determination including determining whether to permit measurement of the transmission channel bandwidth, based on whether identification information of each of the plurality of communication devices that transmitted the establishment request is stored in a first storage portion of the communication device, the transmission channel bandwidth being a usable bandwidth in a transmission channel to and from another communication device via a network, the first storage portion storing identification information that identifies a communication device with which measurement of the transmission channel bandwidth is permitted; and selecting, as a session establishment sequence, one of a first sequence and a second sequence, the first sequence being selected in response to determining, in the first determination, that the measurement of the transmission channel bandwidth to and from a specific device is permitted, the second sequence being selected in response to determining, in the first determination, that measurement of the transmission channel bandwidth to and from the specific device is not permitted, and the specific device being one of the plurality of communication devices, wherein the first sequence comprises:

performing a first measurement including measuring the transmission channel bandwidth to and from the specific device;

performing a second determination after the first measurement has performed, the second determination including determining whether permission input has been received for the specific device, the permission input permitting establishment of the session;

establishing the session between the communication device and the specific device in response to determining, in the second determination, that the permission input has been received without establishing the session between the communication device and the specific device in response to determining, in the second determination, that the permission input has not been received; and setting the usable bandwidth for the data communication based on the measurement of the transmission channel bandwidth to and from the specific device performed in the first measurement, and wherein the second sequence comprises:

performing a third determination including determining whether the permission input has been received for the specific device;

performing a second measurement including measuring the transmission channel bandwidth to and from the specific device in response to determining, in the third determination, that the permission input has been received without measuring the transmission channel bandwidth to and from the specific device in response to determining, in the third determination, that the permission input has not been received;

establishing the session between the communication device and the specific device in response to determining, in the third determination, that the permission input has been received without establishing the session between the communication device and the specific device in response to determining, in the third determination, that the permission input has not been received; and setting the usable bandwidth for the data communication based on the measurement of the transmission channel bandwidth to and from the specific device performed in the second measurement.

12. A non-transitory computer readable recording medium storing computer readable instructions that, when executed, cause a communication device to:

receive an establishment request from each of a plurality of communication devices, the establishment request requesting establishment of a session;

performing a first determination including determining whether to permit measurement of the transmission channel bandwidth, based on whether identification information of each of the plurality of communication devices that transmitted the establishment request is stored in a first storage portion of the communication device, the transmission channel bandwidth being a usable bandwidth in a transmission channel to and from another communication device via a network, the first storage portion storing identification information that identifies a communication device with which measurement of the transmission channel bandwidth is permitted; and select, as a session establishment sequence, one of a first sequence and a second sequence, the first sequence being selected in response to determining, in the first determination, that the measurement of the transmission channel bandwidth to and from a specific device is permitted, the second sequence being selected in response to determining, in the first determination, that measurement of the transmission channel bandwidth to and from the specific device is not permitted, and the specific device being one of the plurality of communication devices, wherein the first sequence comprises:

performing a first measurement including measuring the transmission channel bandwidth to and from the specific device;

performing a second determination after the first measurement has performed, the second determination including determining whether permission input has been received for the specific device, the permission input permitting establishment of the session;

establishing the session between the communication device and the specific device in response to determining, in the second determination, that the permission input has been received without establishing the session between the communication device and the specific device in response to determining, in the second determination, that the permission input has not been received; and setting the usable bandwidth for the data communication based on the measurement of the transmission channel bandwidth to and from the specific device performed in the first measurement, and wherein the second sequence comprises:

performing a third determination including determining whether the permission input has been received for the specific device;

performing a second measurement including measuring the transmission channel bandwidth to and from the specific device in response to determining, in the third determination, that the permission input has been received without measuring the transmission channel bandwidth to and from the specific device in response to determining, in the third determination, that the permission input has not been received;

establishing the session between the communication device and the specific device in response to determining, in the third determination, that the permission input has been received without establishing the session between the communication device and the specific device in response to determining, in the third determination, that the permission input has not been received; and setting the usable bandwidth for the data communication based on the measurement of the transmission channel bandwidth to and from the specific device performed in the second measurement.

\* \* \* \* \*